(12) United States Patent
Deachin et al.

(10) Patent No.: US 9,713,885 B2
(45) Date of Patent: Jul. 25, 2017

(54) SEALING ASSEMBLY

(75) Inventors: Todd R. Deachin, Goodrich, MI (US); Conrad Miracle, Capac, MI (US)

(73) Assignee: Zephyros, Inc., Romeo, MI (US)

( * ) Notice: Subject to any disclaimer, the term of this patent is extended or adjusted under 35 U.S.C. 154(b) by 589 days.

(21) Appl. No.: 13/313,429

(22) Filed: Dec. 7, 2011

(65) Prior Publication Data

US 2012/0146296 A1 Jun. 14, 2012

Related U.S. Application Data (60) Provisional application No. 61/420,869, filed on Dec. 8, 2010.

(51) Int. Cl.
*F16J 15/02* (2006.01)
*B29C 44/18* (2006.01)

(52) U.S. Cl.
CPC .................. *B29C 44/188* (2013.01)

(58) Field of Classification Search
CPC .. F16J 15/46; F16J 15/14; F01N 1/083; F01N 1/089; F01N 1/084; C04B 18/08; B29C 44/188
USPC ........ 277/646, 934, 605, 316; 181/264, 265; 428/317.9, 137
See application file for complete search history.

(56) References Cited

U.S. PATENT DOCUMENTS

| | | |
|---|---|---|
| 625,559 A | 5/1899 | Keeler |
| 4,751,249 A | 6/1988 | Wycech |
| 4,813,690 A | 3/1989 | Coburn, Jr. |
| 4,901,500 A | 2/1990 | Wycech |
| 5,266,133 A | 11/1993 | Hanley et al. |
| 5,358,397 A | 10/1994 | Ligon et al. |
| 5,506,025 A | 4/1996 | Otto et al. |
| 5,575,526 A | 11/1996 | Wycech |
| 5,642,914 A * | 7/1997 | Takabatake .......... B62D 29/002 296/187.02 |
| 5,708,042 A | 1/1998 | Hasegawa |
| 5,755,486 A | 5/1998 | Wycech |
| 5,766,719 A | 6/1998 | Rimkus |
| 5,931,474 A | 8/1999 | Chang et al. |
| 5,932,680 A | 8/1999 | Heider |
| 6,068,922 A | 5/2000 | Vercesi et al. |
| 6,131,897 A | 10/2000 | Barz et al. |
| 6,150,428 A | 11/2000 | Hanley et al. |
| 6,199,940 B1 | 3/2001 | Hopton et al. |

(Continued)

FOREIGN PATENT DOCUMENTS

| | | |
|---|---|---|
| DE | 3838655 A1 | 5/1990 |
| DE | 19856255 C1 | 3/1998 |

(Continued)

OTHER PUBLICATIONS

International Search Report and Written Opinion dated Mar. 14, 2012; for Corresponding PCT Application No. US 2011/063698 filed Dec. 7, 2011.

(Continued)

*Primary Examiner* — Kristina Fulton
*Assistant Examiner* — Nathan Cumar
(74) *Attorney, Agent, or Firm* — The Dobrusin Law Firm, PC (57) ABSTRACT

A device and method for reinforcing, baffling or sealing a vehicle structure, comprising the steps of providing a flexible composite sealing device including one or more fastening structures.

20 Claims, 6 Drawing Sheets

(56) References Cited

U.S. PATENT DOCUMENTS

| | | |
|---|---|---|
| 6,207,244 B1 | 3/2001 | Hesch |
| 6,270,600 B1 | 8/2001 | Wycech |
| 6,276,105 B1 | 8/2001 | Wycech |
| 6,287,666 B1 | 9/2001 | Wycech |
| 6,296,298 B1 | 10/2001 | Barz |
| 6,305,136 B1* | 10/2001 | Hopton .............. B29C 44/18 296/146.6 |
| 6,305,495 B1* | 10/2001 | Keegan ................ 181/290 |
| 6,368,438 B1 | 4/2002 | Chang |
| 6,383,610 B1* | 5/2002 | Barz et al. ............ 428/192 |
| 6,389,775 B1 | 5/2002 | Steiner |
| 6,413,611 B1 | 7/2002 | Roberts |
| 6,422,575 B1 | 7/2002 | Czaplicki |
| 6,455,146 B1 | 9/2002 | Fitzgerald |
| 6,546,693 B2 | 4/2003 | Wycech |
| 6,620,501 B1 | 9/2003 | Kassa et al. |
| 6,649,243 B2 | 11/2003 | Roberts et al. |
| 6,706,772 B2 | 3/2004 | Czaplicki |
| 6,786,533 B2 | 9/2004 | Bock |
| 6,799,931 B2* | 10/2004 | Kwilosz ............ F16B 21/084 24/453 |
| 6,811,864 B2 | 11/2004 | Czaplicki |
| 6,820,923 B1 | 11/2004 | Bock |
| 6,846,559 B2 | 1/2005 | Czaplicki |
| 6,920,693 B2 | 7/2005 | Hankins |
| 6,926,784 B2 | 8/2005 | Bock |
| 6,991,237 B2 | 1/2006 | Kassa |
| 7,011,315 B2 | 3/2006 | Czaplicki |
| 7,077,460 B2 | 7/2006 | Czaplicki |
| 7,125,461 B2 | 10/2006 | Czaplicki et al. |
| 7,169,467 B2 | 1/2007 | Wilson |
| 7,199,165 B2 | 4/2007 | Kassa et al. |
| 7,313,865 B2 | 1/2008 | Czaplicki et al. |
| 8,028,799 B2 | 10/2011 | Hasler |
| 8,079,442 B2 | 12/2011 | Wojtowicki |
| 8,087,916 B2 | 1/2012 | Kanie et al. |
| 8,293,350 B2 | 10/2012 | Cousin |
| 8,388,037 B2 | 3/2013 | LaNore et al. |
| 8,444,214 B2 | 5/2013 | Helferty et al. |
| 8,469,143 B2 | 6/2013 | Prunarety et al. |
| 2002/0053179 A1* | 5/2002 | Wycech .............. B29C 44/18 52/834 |
| 2002/0074827 A1* | 6/2002 | Fitzgerald et al. ........... 296/188 |
| 2003/0045620 A1 | 3/2003 | Carlson et al. |
| 2004/0011282 A1 | 1/2004 | Myers et al. |
| 2004/0076831 A1 | 4/2004 | Hable et al. |
| 2005/0260399 A1 | 11/2005 | Finerman |
| 2006/0020076 A1 | 1/2006 | Finerman |
| 2006/0073266 A1 | 4/2006 | Myers et al. |
| 2007/0193171 A1 | 8/2007 | Finerman |
| 2008/0110694 A1* | 5/2008 | Niezur et al. ................ 181/264 |
| 2009/0001758 A1 | 1/2009 | Hanley, IV et al. |
| 2009/0111371 A1 | 4/2009 | Niezur et al. |
| 2009/0223739 A1* | 9/2009 | Duffin ................ B60R 13/08 181/196 |
| 2010/0021267 A1 | 1/2010 | Nitsche |
| 2010/0253004 A1 | 10/2010 | Lehmann |
| 2010/0320028 A1 | 12/2010 | Wojtowicki |
| 2011/0057392 A1 | 3/2011 | Monnet et al. |
| 2011/0063698 A1 | 3/2011 | Liu et al. |
| 2011/0109003 A1 | 5/2011 | LaNore et al. |
| 2011/0189428 A1 | 8/2011 | Belpaire et al. |
| 2011/0192675 A1 | 8/2011 | Lecroart et al. |
| 2012/0207986 A1 | 8/2012 | Belpaire et al. |
| 2012/0295093 A1 | 11/2012 | Belpaire et al. |
| 2013/0087406 A1 | 4/2013 | Franey |
| 2013/0140731 A1 | 6/2013 | Belpaire |
| 2013/0181470 A1 | 7/2013 | LaNore et al. |

FOREIGN PATENT DOCUMENTS

| | | | |
|---|---|---|---|
| DE | 19648164 | A1 | 5/1998 |
| DE | 19812288 | C1 | 5/1999 |
| DE | 29904705 | U1 | 6/1999 |
| DE | 19835704 | A1 | 2/2000 |
| EP | 0383498 | A2 | 8/1990 |
| EP | 0697956 | B1 | 2/1996 |
| EP | 0730999 | A1 | 9/1996 |
| EP | 0893332 | A1 | 1/1999 |
| EP | 1122152 | A2 | 8/2001 |
| EP | 1149679 | A2 | 10/2001 |
| EP | 1435320 | A2 | 7/2004 |
| EP | 1280658 | B1 | 8/2009 |
| EP | 2097308 | B1 | 9/2009 |
| EP | 2134799 | A1 | 12/2009 |
| EP | 2236358 | B1 | 6/2010 |
| EP | 2242634 | A1 | 10/2010 |
| EP | 2176113 | B1 | 4/2011 |
| EP | 2330019 | A1 | 8/2011 |
| EP | 2360002 | A1 | 8/2011 |
| EP | 2390077 | A1 | 11/2011 |
| EP | 2507116 | A1 | 10/2012 |
| EP | 2533961 | A1 | 12/2012 |
| EP | 2576176 | A1 | 4/2013 |
| EP | 1534561 | B1 | 8/2013 |
| EP | 2262633 | B1 | 9/2013 |
| FR | WO 2008080415 | * | 7/2008 ........... B62D 29/002 |
| GB | 903146 | A | 8/1962 |
| JP | 9328568 | A | 12/1997 |
| JP | 11-165598 | A | 6/1999 |
| JP | 2002221968 | A | 8/2002 |
| JP | 2002331960 | A | 11/2002 |
| JP | 2002-347058 | A | 12/2002 |
| JP | 2004-230834 | A | 8/2004 |
| JP | 2006-123710 | A | 5/2006 |
| WO | 95/25085 | A1 | 9/1995 |
| WO | 97/02967 | A1 | 1/1997 |
| WO | 98/36944 | A1 | 8/1998 |
| WO | 98/50221 | A1 | 11/1998 |
| WO | 99/08854 | A1 | 2/1999 |
| WO | 00/43253 | A | 7/2000 |
| WO | 00/46017 | A1 | 8/2000 |
| WO | 01/19667 | A1 | 3/2001 |
| WO | 01/54936 | A1 | 8/2001 |
| WO | 01/88033 | A1 | 11/2001 |
| WO | 2005/077634 | A2 | 8/2002 |
| WO | 03/089221 | A1 | 10/2003 |
| WO | 2005/113689 | A1 | 12/2005 |
| WO | 2008/065049 | A1 | 6/2008 |
| WO | 2009/049886 | A1 | 4/2009 |
| WO | 2009/117376 | A1 | 9/2009 |
| WO | 2011/134943 | A1 | 11/2011 |
| WO | 2011/147872 | A1 | 12/2011 |
| WO | 2012/078729 | A1 | 6/2012 |

OTHER PUBLICATIONS

Corresponding PCT Application No. US 2011/063698 filed Dec. 7, 2011; Published as WO 2012/078729 A1 on Jun. 14, 2012.

Chinese Office Action dated Sep. 26, 2011; Appln. No. 200980109337.3.

Peter Born; Bernd Mayer Structural Bonding in Automotive Applications.

Gregory W. Hopton; Philip E. Weber; Leslie J. Osenkowski; Gerald J.Renaud, Application of a Structural Reinforcing Material to Improve Vehicle NVH Characteristics.

Kurt Lilley; Eric Seifferlein; Anita Zalobsky Comparison of Preformed Acoustic Baffles and Two-Component Polyurethane Foams for Filling Body Cavities.

Kurt M. Lilley; Michael J. Fasse; Philip E. Weber A Comparison of NVH Treatments for Vehicle Floorplan Applications.

Kurt M. Lilley; Phil E. Weber Vehicle Acoustic Solutions.

Chinese Office Action dated Jan. 22, 2015; Appln. No. 201180059336X.

\* cited by examiner

SEALING ASSEMBLY

CLAIM OF PRIORITY

The present application claims the benefit of the priority of U.S. Provisional Application Ser. No. 61/420,869 filed Dec. 8, 2010, the contents of which are incorporated by reference herein.

TECHNICAL FIELD

The present invention relates generally to a baffling, sealing, or reinforcement member that includes a composite structure and one or more fasteners.

BACKGROUND

The transportation industry continues to require methods of baffling, reinforcement and sealing that provide improved functionality while simultaneously providing reduced weight and cost. Often, when attempting to reduce the weight of a part providing baffling, reinforcement, and/or sealing, the lightweight nature of the support material does not provide the necessary strength for effective baffling, reinforcement and sealing. Thus, reduced functionality often accompanies lightweight sealing, reinforcement and baffling mechanisms. For example, sufficient rigidity and strength are required to prevent a sealing, reinforcement, and/or baffling system from sagging or becoming dislodged from an intended position and thereby failing to effectively seal or baffle. As a result, efforts to reduce part weight often produce weakened sealing, reinforcement, and/or baffling assemblies that are easily dislodged and fail to sufficiently seal, reinforce, and/or baffle. There is thus a need in the art of sealing for low weight sealing, reinforcement, and baffling assemblies that avoid sag and disengagement from a location within a cavity.

SUMMARY OF THE INVENTION

In a first aspect the present invention contemplates a sealing device for a cavity comprising a sealing body having a first material layer, a second material layer, and one or more fasteners attached to or integrally formed with the first material layer, the second material layer, or both. The sealing body may have a constant thickness that extends from one edge of the sealing body to an opposing edge of the sealing body. The first material layer may have a constant thickness. The first material layer may have a variable thickness. The second material layer may include an expandable material that is bonded to the first material layer. The expandable material may have a lower rigidity than the first material layer but a higher yield strength than the first material layer. The one or more fasteners may be separately formed from the sealing body or integrally formed with the sealing body. The one or more fasteners may include a first portion for attaching the sealing body to a cavity wall. The one or more fasteners may include a second portion interconnected to the first portion for attaching the fastener to the sealing body. The first portion may project substantially laterally outward from the plane of the sealing body. The one or more fasteners may be configured so that when located within a cavity, the sealing body projects substantially rigidly away from a cavity wall in a predetermined configuration. The perimeter of the sealing body may be generally shaped to fit within the cross-section of a cavity for sealing, having a profile substantially similar to that of the cavity. The sealing body may be deformable and yet still retain its shape by virtue of the first material layer. The first material layer may also allow the sealing body to resist sagging under its own weight at a temperature to at least above 250° F.

In a second aspect of the present invention, there is contemplated a method for sealing a cavity comprising providing a substantially planar sealing body. The sealing body is provided by bonding a first material layer to a second material layer. The second material layer may be an expandable material having a lower rigidity than the first material layer but a higher yield strength than the first material layer after cure. The sealing method further includes attaching one or more fasteners to the sealing body or forming one or more integrally formed fasteners on the sealing body. In attaching and/or forming the one or more fasteners, a first portion of the fastener may be attached to a cavity wall and a second portion of the fastener may be attached to the sealing body. The first portion and second portion of the one or more fasteners may be interconnected with one another and/or integrally formed as one fastener. The second portion of the one or more fasteners may be attached to or integrally formed with the first material layer, the second material layer, or both. One or more openings may be formed in the first material layer, the second material layer, or both. The one or more openings may be formed for attaching the one or more fasteners. The sealing body may be arranged within the cavity so that the sealing body projects substantially rigidly away from a cavity wall in a predetermined configuration.

The invention herein contemplates a device and method for the sealing of cavities with a deformable composite sealing body having one or more fasteners for locating and/or fastening the sealing body within a cavity. The sealing device disclosed herein may allow for effective baffling and/or sealing of a cavity with a lightweight composite structure that resists sag and unwanted movement within the cavity.

DETAILED DESCRIPTION

The present invention allows for improved baffling, reinforcement, and sealing of a cavity with a lightweight composite sealing device. The sealing device disclosed herein may include a first material layer bonded to a second material layer and one or more separately attached or integrally formed fasteners for securing the sealing assembly within a cavity. One or more of the first and second material layers may impart localized stiffening to the sealing device while also allowing the sealing device to flex. The flexible nature of the sealing device prevents permanent deformation of the device if it is deformed during installation or use. The localized stiffening provides a spring-like function so that the sealing device returns to its original shape after temporary deformation. The flexible nature of the sealing device also permits the device to be located within a cavity in a flexed position so that a sealing device that is initially planar is flexed and placed within a cavity in a non-planar form. Thus, a planar, two-dimensional sealing device can be flexed to a three dimensional form upon placement within a cavity. The fasteners may be attached to or integrally formed with the first material layer, the second material layer, or both. The fasteners may further prevent rotation of the sealing device once installed into a cavity.

Figure 1A:
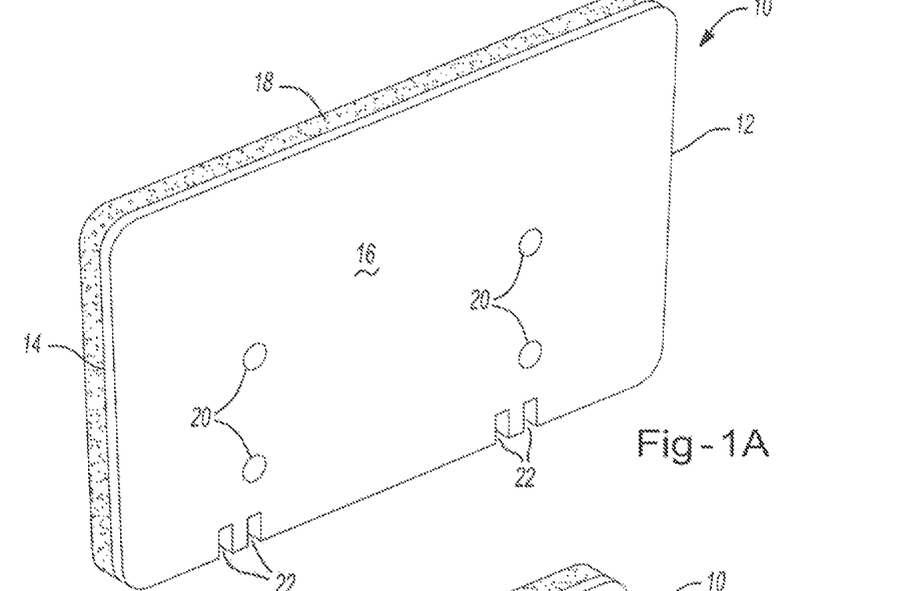
FIG. 1A shows a perspective view of an illustrative example of the composite structure of the present invention prior to attachment of any fasteners.

FIG. 1A shows the composite sealing device 10 having a first material layer 12 including a top surface 14 and a bottom surface 16. The top surface 14 of the first material layer 12 is bonded to a second expandable material layer 18 (shown prior to expansion). In the embodiment shown, the second expandable material layer 18 is co-extensive with and extends to cover the entire top surface 14 of the first material layer 12. The first material layer 12, the second expandable material layer 18 (prior to expansion), or both, may be substantially planar surfaces as shown. The first material layer 12 and second expandable material layer 18 may include multiple aligned openings 20 for attaching to one or more fasteners. The first material layer 12 and second expandable material layer 18 may include one or more grooves 22 for accepting a portion of one or more fasteners. Any openings 20 and/or grooves 22 are preferably sealed upon attachment of the one or more fasteners to the sealing device by placement of the one or more fasteners into the openings 20 and/or grooves 22.

Figure 1B:
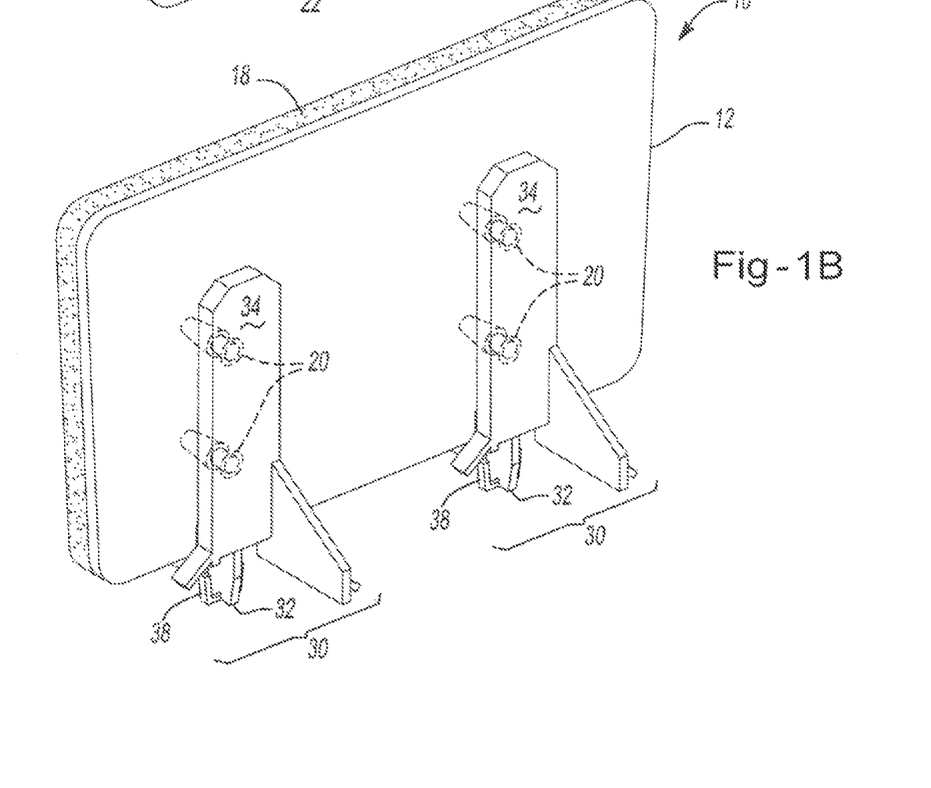
FIG. 1B shows the composite structure of FIG. 1A after attachment of fasteners.

FIG. 1B shows the composite sealing device 10 of FIG. 1A with multiple fasteners 30 attached to the sealing device. Each fastener 30 includes a first portion 32 and a second portion 34. The second portion 34 of each fastener 30 includes one or more extensions 36 that contact the aligned openings 20 located within the first material layer 12 and second expandable material layer 18 so that each fastener 30 is attached to the sealing device 10. The second portion 34 of each fastener may also contact the grooves located within the sealing device 10. The first portion 32 of each fastener may include a structure for attaching to an opening in a cavity wall. The first portion 32 of the fastener shown includes an arrowhead portion 38.

Figure 2:
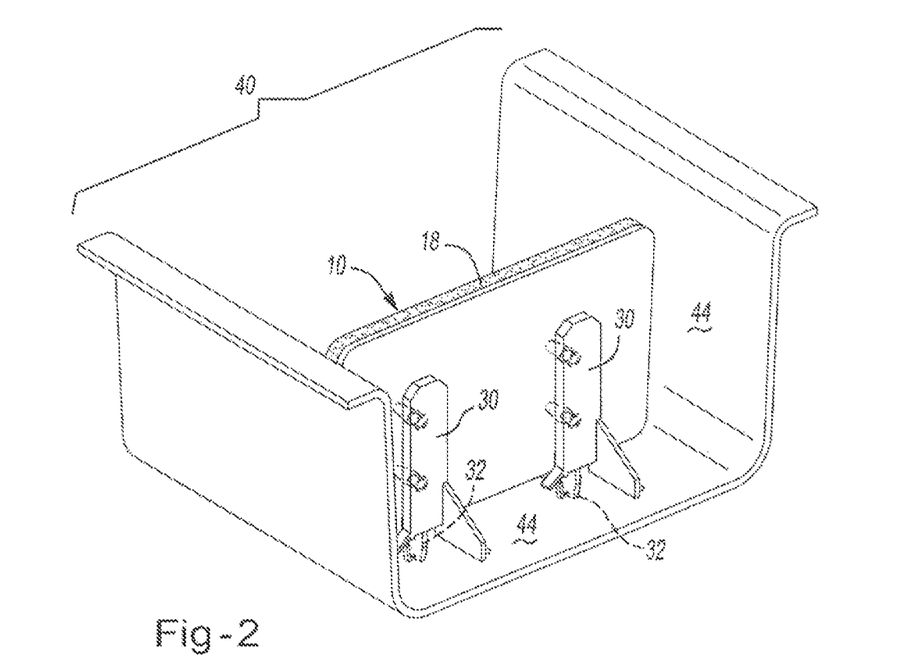
FIG. 2 shows the composite structure of FIG. 1 located within a cavity prior to expansion of the expandable material.
Figure 3:
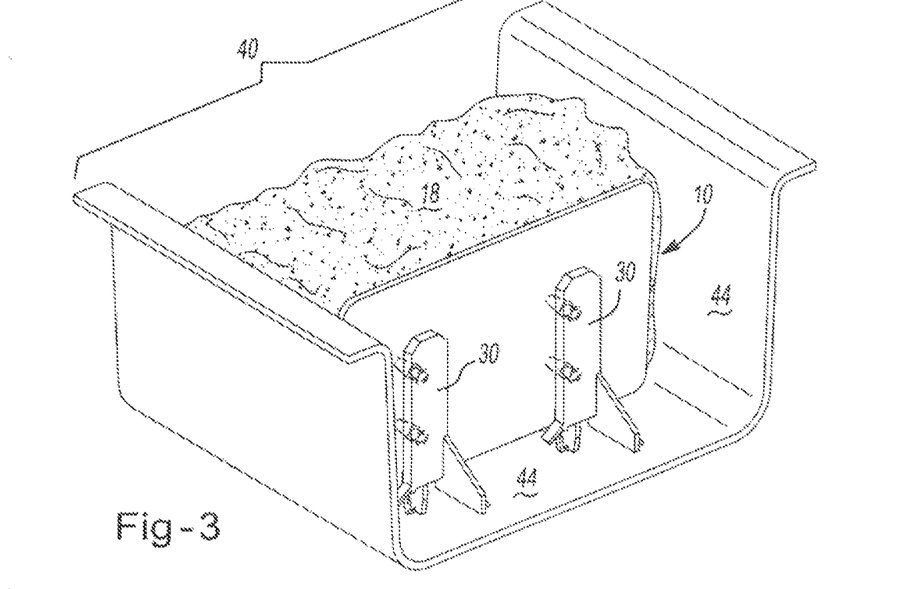
FIG. 3 shows the composite structure of FIG. 1 located within a cavity and after expansion of the expandable material.

FIG. 2 shows the sealing device 10 of FIG. 1B located within a cavity 40 prior to expansion of the second expandable material layer 18. The cavity 40 includes openings (not shown) in the cavity wall 44 for receiving the first portion 32 of each fastener 30. FIG. 3 shows the sealing assembly 10 of FIG. 1B located within a cavity 40 after expansion of the second expandable material layer 18. The expandable material layer 18 expands to contact one or more walls 44 of the cavity. The attachment of the fasteners 30 to the openings (not shown) in the cavity wall 44 and the contact between the expandable material layer 18 and the cavity walls 44 substantially prevents the sealing device 10 from unwanted movement within the cavity 40.

Figure 4A:
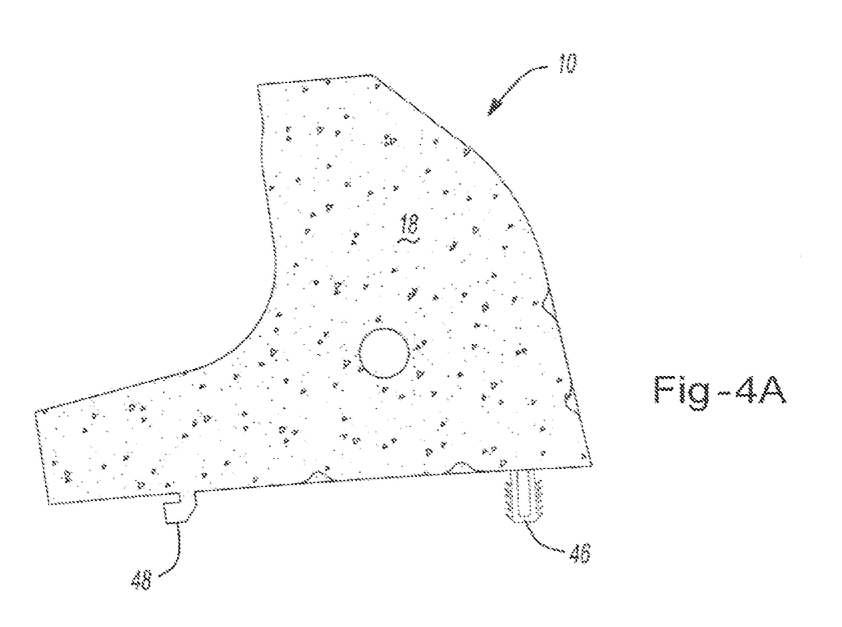
FIG. 4A shows a top view of an additional illustrative example of the composite structure of the present invention.
Figure 4B:
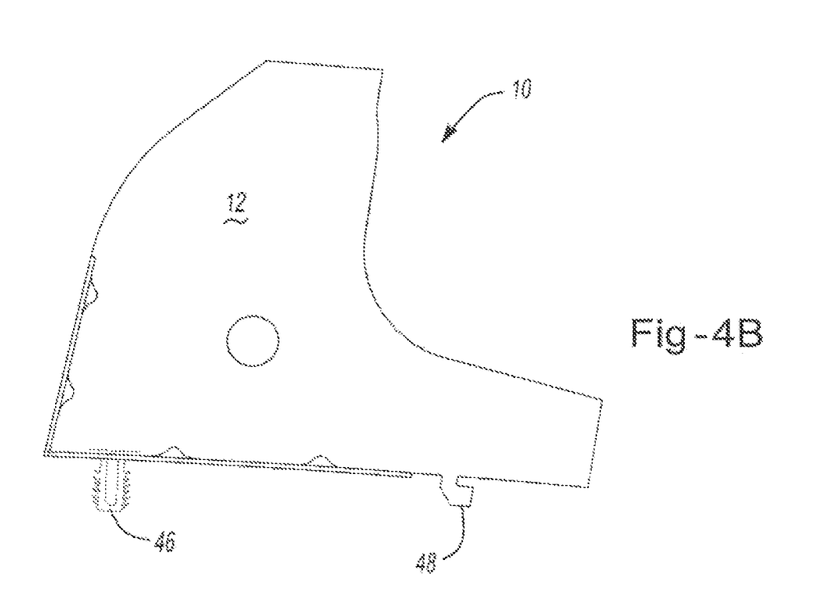
FIG. 4B shows a bottom view of the composite structure of FIG. 4A.
Figure 5A:
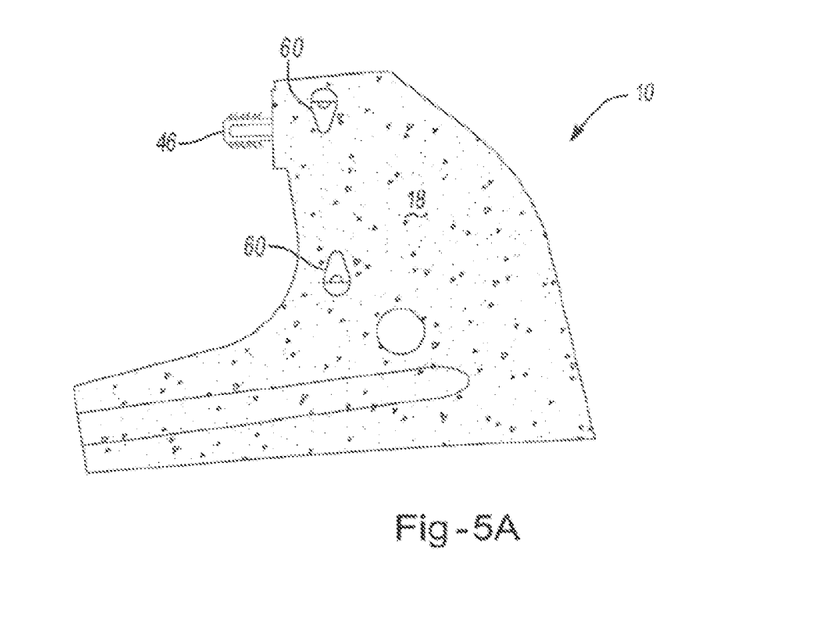
FIG. 5A shows a top view of an additional illustrative example of the composite structure of the present invention.
Figure 5B:
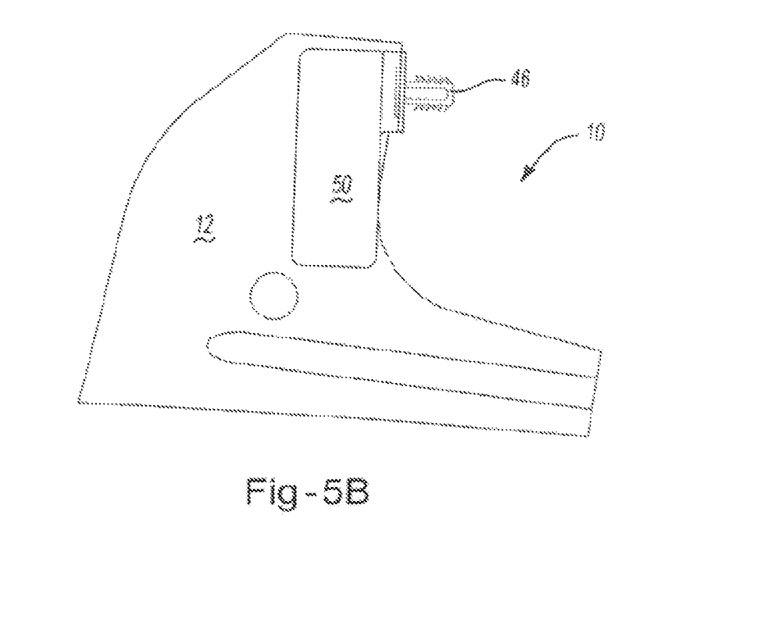
FIG. 5B shows a bottom view of the composite structure of FIG. 4A.

FIGS. 4A and 4B show an additional embodiment of a composite sealing device in accordance with the present invention. The composite sealing device 10 includes a first material layer 12 (shown at 4B) and a second expandable material layer 18 (shown at 4A). The sealing device includes a tree fastener 46 and an integrally formed projection 48, both for locating the sealing device within a cavity. FIGS. 5A and 5B show an additional embodiment of the present invention. The sealing device 10 includes a first material layer 12 (shown at 5B) and a second expandable material layer 18 (shown at 5A). The sealing device further includes one or more tab structures 60 for attaching a secondary component 50 (shown at 5B) that includes a tree fastener 46.

Figure 6:
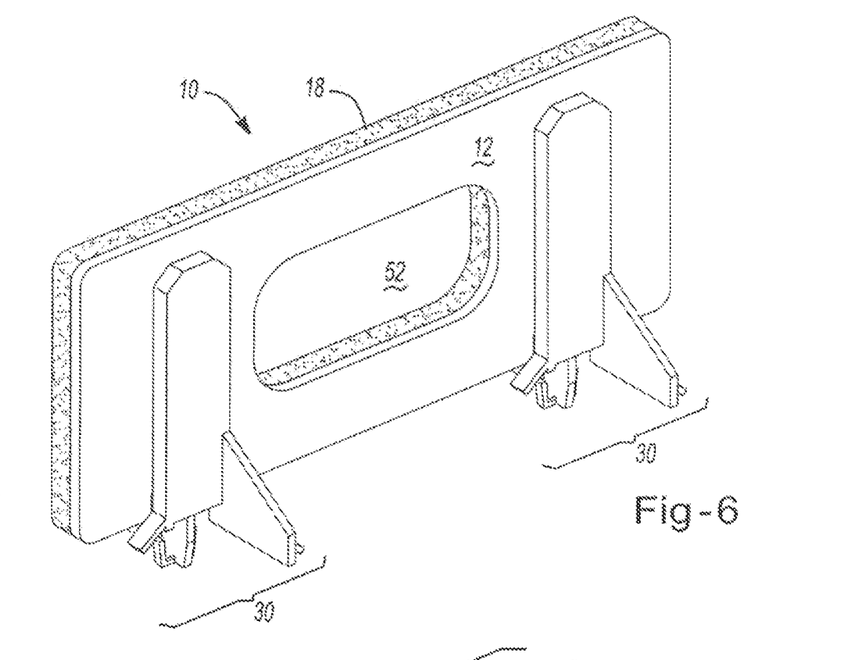
FIG. 6 shows a perspective view of an additional illustrative example of the composite structure of the present invention.
Figure 7:
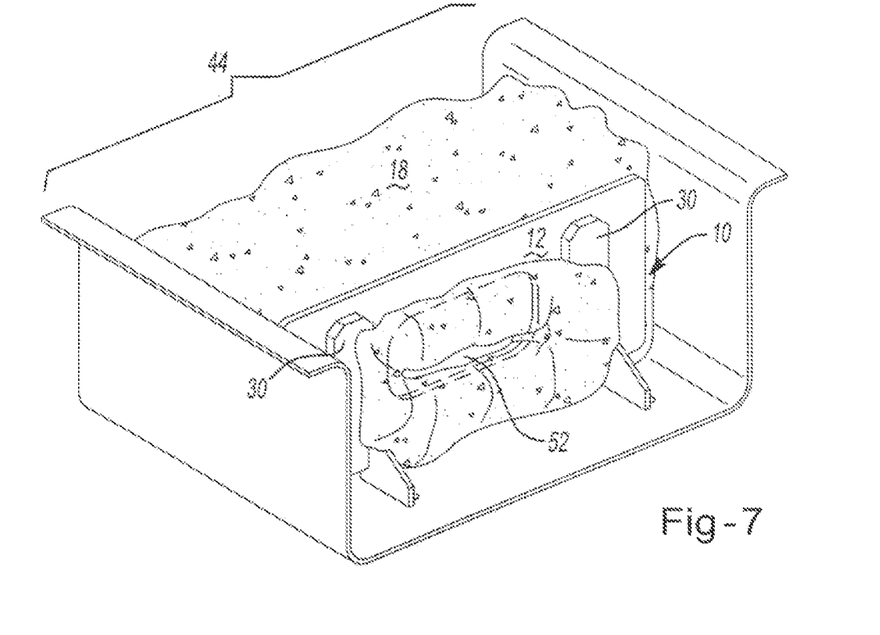
FIG. 7 shows the composite structure of FIG. 6 after expansion of the expandable material.

FIGS. 6 and 7 show an additional embodiment of the sealing device of the present invention. FIG. 6 shows the sealing device prior to expansion of the expandable material layer 18, while FIG. 7 shows the sealing device of FIG. 6 located within a cavity and post-expansion of the expandable material layer 18. The sealing device 10 includes a first material layer 12 in planar contact with the second expandable material layer 18 and one or more fasteners 30 for locating the sealing device within a cavity 44. The sealing device 10 also includes an aperture 52 through which at least a portion of the expandable material layer 18 may flow.

Figure 8A:
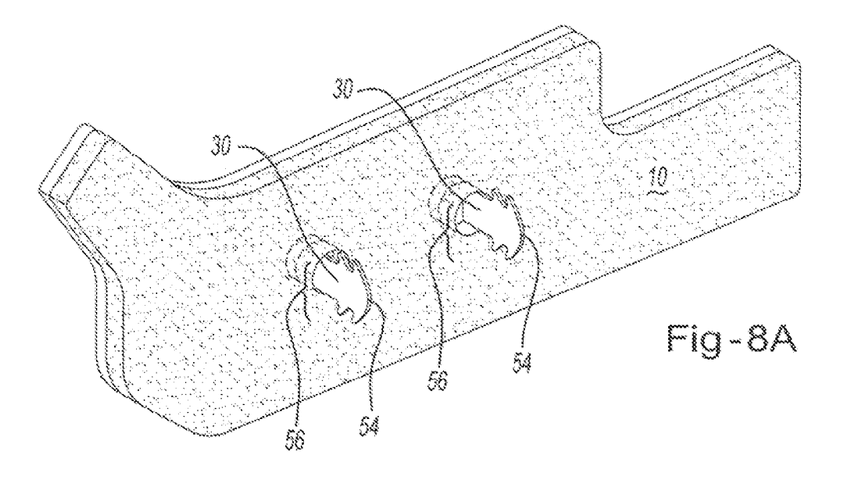
FIG. 8A shows a perspective view of an illustrative example of the composite structure of the present invention having integrally formed fasteners formed as tabs that originate as cut-outs from the composite structure.
Figure 8B:
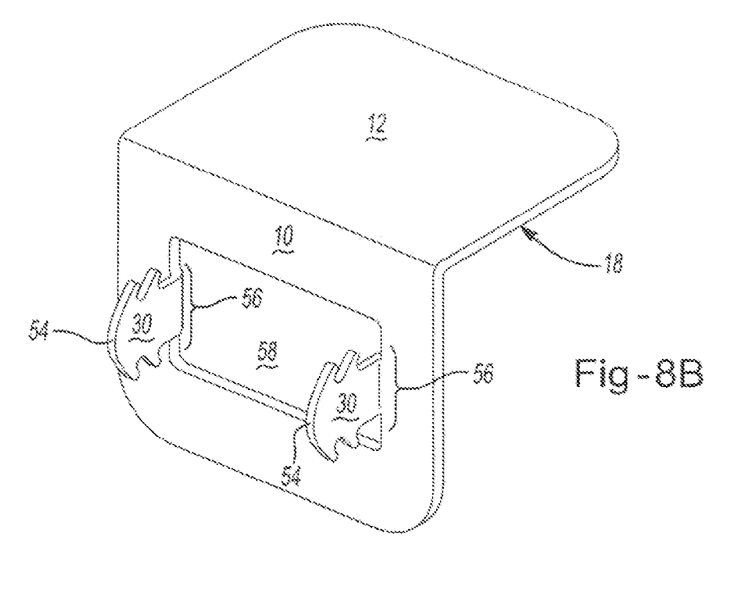
FIG. 8B shows a perspective view of an illustrative example of an additional embodiment of the present invention having integrally formed fasteners formed as tabs that originate as cut-outs from the composite structure.

As shown for example in FIG. 8B, the one or more fasteners 30 may be integrally formed with the sealing device 10. The one or more fasteners 30 may be formed as cut-outs 54 within the sealing device, such that at least one edge 56 of the fastener remains connected to the sealing device 10. The cut-outs may be formed (e.g., cut, die-cut, laser-cut) within the sealing device. The cut-outs 54 may be formed in the first material layer 12, the second expandable material layer 18, or both (as shown in FIG. 8B). In the event that the cut-outs are formed in both the first and second material layers, an opening will be formed in the sealing device at the location 58 where the cut-out material was present prior to forming the cut-out fasteners. Upon forming the cut-outs into an integrally formed fastener, the material may be moved, bent, or otherwise deformed in a particular direction so the sealing device is fastened in a desired location and/or direction. The cut-outs may be bent so that they are arranged substantially perpendicular to the first material, the second material layer, or both. Alternatively, the cut-outs may be bent so that they are arranged at a skew angle in relation to the first material layer, the second material layer, or both.

An additional embodiment having integrally formed cut-out fasteners is shown at FIG. 8A. The one or more fasteners 30 are formed as cut-outs 54 within the sealing device 10. Similar to FIG. 8A, at least one edge 56 of the fastener remains connected to the sealing device 10.

The size and shape of the sealing device may depend upon the desired location of the device within a cavity. As shown in FIGS. 2 and 3, the perimeter of the sealing device may be shaped so that it fits within and conforms to a cross-section of the cavity. The sealing device may be shaped so that the expandable material layer expands directly into areas that are traditionally difficult to access (e.g., small areas within a cavity that are difficult to seal due to the size and shape of the area). As shown for example, in FIGS. 3 and 7, the expandable material layer may expand beyond the edge of the first material layer to reach areas of the cavity that are not contacted by the first material layer. This directional expansion of the expandable material may allow for larger spaces between the perimeter of the sealing device and the cavity wall prior to expansion, without the result of reduced sealing efficacy. The size and shape of the sealing device may thus depend on the size and shape of the cavity in which the sealing device will be placed. The sealing device may be located within a cavity with one or more fasteners so that the perimeter of the sealing device does not contact the cavity wall prior to expansion of the expandable material layer. Upon expansion of the expandable material, the expanded material may contact the cavity wall. The sealing device may be shaped so that two identical sealing devices can be used for both right hand and left hand parts by merely modifying the direction of placement within the cavity, thereby eliminating the need for distinct right-hand parts and left-hand parts. The sealing device may be reversible, or in other words shaped so that the device properly seals whether the first material layer or the expandable material layer faces upward within a cavity, thus avoiding any problems that might arise from improper insertion direction. Further, the sealing device may be permanently flexed into a non-planar shape upon placement within a cavity so that the shape of the sealing device corresponds to the area of a cavity requiring sealing, baffling or reinforcement. As a result, the sealing device described herein allows for one planar sealing device that can be flexed, bent or otherwise formed in numerous varying shapes or positions for ideal fit within a cavity. The result is a simplified and easily customized device for sealing, baffling and reinforcement so that specially shaped devices that are molded to fit into one particular cavity are not required.

As discussed above, the size of the sealing device may depend upon the size of the cavity in which the sealing device is located. The thickness of the sealing device may be at least about 0.1 mm. The thickness of the sealing device may be less than about 10 mm. The thickness of the sealing device may be from about 0.5 mm to about 6 mm. The thickness of the first material layer may be less than the thickness of the expandable material layer. The thickness of the first material layer may be greater than the thickness of the expandable material layer. The thickness of the first material layer may be at least about 0.01 mm. The thickness of the first material layer may be less than about 8 mm. The thickness of the first material layer may be from about 0.2 mm to about 5 mm. The thickness of the expandable material layer may be at least about 0.01 mm. The thickness of the expandable material layer may be less than about 8 mm. The thickness of the expandable material layer may be from about 0.2 mm to about 5 mm.

The sealing device may include one or more openings, as shown for example in FIGS. 6-8. The openings may be present so as to reduce the amount of material required to effectively seal a cavity, thereby reducing the weight of the device. The expandable material layer may expand to cover the one or more openings. Alternatively, the sealing device may include edges, slots, or attachments that guide the expansion of the expandable material and thus prevent the expandable material from covering the one or more openings. The one or more openings may be present so that fluid (e.g., e-coat fluid) can drain from one side of the sealing device to the other prior to expansion of the expandable material. The one or more openings may allow for devices or materials within a cavity to pass from one side of the sealing device to another side of the sealing device before or after expansion of the expandable material. As an example, the one or more openings may allow for drain tube passage. The one or more openings may also provide access points within a cavity for welding purposes.

The first material layer may comprise a flat metal sheet. The first material layer may be a high strength to weight metal, such as aluminum, titanium, magnesium or any combination thereof. The first material layer may comprise a steel material (e.g., a carbon steel). The first material layer may also be made of a sheet molding compound or bulk molding compound such as that described in U.S. Pat. No. 7,313,865 incorporated by reference herein for all purposes. The first material layer may also include a mesh material. The first material layer may include a variety of other materials such as polymers, elastomers, fibrous materials (e.g., cloth or woven materials), thermoplastics, plastics, nylon, and combinations thereof. The first material layer of multiple sealing devices may be fabricated from a common sheet of material (e.g., shim steel) to help avoid waste. The first material layer may be flexible to allow for bending of the sealing device to fit within desired small spaces of a cavity.

After placement of the sealing device into a cavity, the expandable material may expand according to a predetermined set of conditions. For example, exposure to certain levels of heat may cause the expandable material to expand. FIGS. 3 and 7 illustrate examples of expansion characteristics of the expandable material layer. The volumetric expansion of the expandable material may vary depending upon the sealing and/or baffling needs of a particular cavity. The expandable material layer may expand at least about 100%. The expandable material may expand less than about 2000%. The expandable material may expand at least about 500%, at least about 1000%, or more. The expandable material may expand less than about 1000% or even less than about 500%.

The expandable material layer may be generally dry to the touch or tacky and may be shaped in any form of desired pattern, placement, or thickness, but is preferably of substantially uniform thickness. Though other heat-activated materials are possible for the expandable material layer, a preferred heat activated material is an expandable polymer or plastic, and preferably one that is foamable. The expandable material layer may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104. The expandable material layer may be die cut extruded sheets of material. It may be co-extruded with the first material layer.

A number of baffling or sealing foams may also be used for the expandable material layer. A typical foam includes a polymeric base material, such as one or more ethylene-based polymers which, when compounded with appropriate ingredients (typically a blowing and curing agent), will expand and cure in a reliable and predictable manner upon the application of heat or the occurrence of a particular condition. From a chemical standpoint for a thermally-activated material, the foam is usually initially processed as a flowable material before curing, and upon curing, the material will typically cross-link making the material incapable of further flow.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The expandable material layer may be mechanically attached to the first material layer. The expandable material layer may also be bonded to the first material layer over its entire surface or may be locally bonded to the first material layer at selected locations (e.g., using a tacking type attachment). The expandable material layer may be attached to the first material layer by an adhesive.

The sealing device may include a fastener such as a tree-fastener or a threaded screw fastener. The fastener may also be provided in a variety of shapes and in a variety of configurations so long as it can secure the sealing device to a cavity. One example of a suitable fastener is disclosed in U.S. Publication No. 2010/0021267 incorporated by reference herein for all purposes. The fastener may be capable of securing multiple layers or types of materials to a structure. Examples of suitable fasteners include mechanical fasteners, clips, tabs, press-fits, snap-fits, screws, hooks, combinations thereof or the like. Furthermore, it is contemplated that the one or more fasteners may be formed integral of a singular material with the material of the sealing device (e.g., the first material or the second material layer) or may be formed of a different material and may be removably attached to the carrier. The fastener may be provided as a magnetic material or an adhesive material that can attach (e.g., adhere or magnetically secure) the sealing device to a cavity. In such an embodiment, the magnetic material or the adhesive material may be interspersed within the first material layer or the expandable material layer. Alternatively, the magnetic material or the adhesive material may be disposed upon the first material layer and/or the expandable material layer or may be otherwise connected to the first material layer and/or the expandable material layer.

As discussed in reference to FIG. 8, the fastener may be an integrally formed fastener whereby the fastener is cut from a portion of the first material layer, the second expandable material layer or both. By cutting the fasteners into integrally formed fasteners a cut-out fastener is formed so that at least a portion of the cut-out fastener is still attached to the sealing device. The shape of the cut-out fastener may depend upon the desired shape for fastening to a cavity. The fastener may be cut to have any fastener shape discussed herein, including but not limited to a tree fastener, a threaded screw fastener or the like. The fastener may be cut to form a tab or may be cut to engage in a friction fit with a corresponding receiving fastener. Upon formation of the cut-out fasteners, the fasteners may be bent, curved and/or otherwise deformed in a direction so that they contact a portion of a cavity and/or a portion of an additional fastening device for attachment to the cavity. The use of these integrally formed cut-out fasteners removes the additional manufacturing step of attaching a separate fastener to the sealing device.

The sealing device may be installed so that the one or more fasteners contact a vehicle cavity wall. The fastening may occur so that the sealing device is rotated upon placement within a vehicle cavity. The fastening may also occur so that the one or more fasteners are pressed into an aperture for receiving the fastener within the cavity wall so that no additional step of movement or rotation is required for installation.

The sealing device of the present invention may be installed into an automotive vehicle although it may be employed for other articles of manufacture such as boats, buildings, furniture, storage containers or the like. The sealing device may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

The sealing device may also include an adhesive layer that comprises an outer surface of the sealing device. The sealing device may be free of hinges or other structural modifications that locally control bending of the sealing device. The sealing device may include a plurality of sides with varying lengths, the lengths of some sides being substantially longer than the lengths of other sides. The fastener may extend from a longer side, a shorter side, or from any side. The fastener may extend from an edge that includes sections that are generally non-linear.

The materials may also include a film layer, such as that disclosed in U.S. Patent Publication Nos. 2004/0076831 and 2005/0260399, incorporated by reference herein for all purposes. The film layer may be used to cover a material that is tacky to the touch. The film layer may be removed from the material prior to application of the material to a vehicle structure, such that the film will reveal a tacky surface of the material that will adhere to the structure.

Formation of the materials of the present invention may include a variety of processing steps depending on the desired configuration of the materials. The sealing device may be formed by an extrusion process followed by optional attachment of fasteners. Additional processing and formation steps may not be required. The formation and processing may thus be free of any molding process. This simplified formation process allows for the shape and size of the sealing device to be quickly modified without requiring a new mold or re-design of the part itself. It is generally contemplated one or more layers of materials or one or more different types of materials, including any fasteners and adhesives may be manually attached to each other, automatically attached to each other or a combination thereof. Moreover, various processes such as molding (e.g., compression, injection or other molding), extrusion or the like may be used to form a carrier material and an expandable material individually and such processes may be employed to attach these materials together.

The materials and formation process of the present invention create a simplified lightweight sealing, reinforcement, and baffling device that can be easily customized to fit any cavity. The extrusion process can produce a sealing device of any shape. The high costs of tooling and materials related to traditional injection molded parts is avoided by providing a simple and easily modified laminate sealer. The sealing device can be reversible to create one part that functions for both right and left installation. The perimeter of the sealing device can stand apart from the cavity wall so that the expandable material layer expands to contact the cavity wall to sufficiently seal the cavity. The lightweight nature of the sealing device avoids undesirable sagging and dislodging of the sealing device. The direction of the sealing device once located within a cavity may be easily modified so that the expandable material layer lies above and is supported by the first material layer. Thus, the expandable material will avoid undesirable dripping or flow during expansion.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A seal device for a cavity comprising:
  a. a sealing body including:
    i. a first material layer of constant thickness;
    ii. a second material layer of expandable material bonded to the first material layer having a lower rigidity than the first material layer
  b. one or more fasteners directly attached to or integrally formed with either or both of the first and/or second material layer wherein the fastener;
    i. includes a first portion attached to a cavity wall and projecting substantially laterally out of the plane of the sealing body;
    ii. includes a second portion interconnected to the first portion of the fastener and attached to the sealing body;
    iii. is configured so that the sealing body projects substantially rigidly away from the cavity wall in a predetermined configuration;
  wherein the perimeter of the sealing body is generally shaped to fit within the cross-section of the cavity and has a profile substantially similar to that of the cavity it is sealing; and
  wherein the sealing body can be deformed and still retain its shape by virtue of the first material layer and resists sagging under its own weight at a temperature to at least above 250° F.

2. The device of claim 1, wherein the sealing body is substantially planar prior to placement within a cavity.

3. The device of claim 1, wherein the sealing body includes one or more grooves for accepting a portion of the one or more fasteners.

4. The device of claim 1, wherein the one or more fasteners include a tab structure.

5. The device of claim 1, wherein the first material layer and second material layer are separable from one another.

6. The device of claim 1, wherein the first material layer, the second material layer, or both include one or more openings.

7. The device of claim 1, wherein the first material layer is a metallic sheet or mesh material.

8. The device of claim 1, wherein the first material layer is a woven or non-woven textile material.

9. The device of claim 1, wherein the bond between the first material layer and second material layer contacts the entire surface of the first material layer, the second material layer, or both.

10. The device of claim 1, wherein the first material layer and second material layer are bonded only along the periphery of the first material layer, the second material layer, or both.

11. The device of claim 1, wherein the expandable material is selected from a structural foam, a structural foam precursor, an acoustic foam, an acoustic foam precursor, a sealing foam, a sealing foam precursor, or any combination thereof.

12. The device of claim 1, wherein the second material layer has the same shape as and is co-extensive with the first material layer throughout the constant thickness of the sealing body.

13. The device of claim 1, wherein the sealing body is free of molded components.

14. The device of claim 1, wherein the one or more fasteners include tree fasteners.

15. The device of claim 1, wherein the one or more fasteners are anti-rotational fasteners.

16. The device of claim 1, wherein the one or more fasteners are separately formed from the first material layer, the second material layer, or both.

17. The device of claim 1, wherein the one or more fasteners are integrally formed with the first material layer, the second material layer, or both.

18. The device of claim 1, wherein the one or more integrally formed fasteners are formed as cut-outs from the first material layer, the second material layer, or both of the sealing device.

19. The device of claim 1, wherein at least a portion of the one or more fasteners are attached to the sealing body via one or more openings in the first material layer, the second material layer or both.

20. A method for sealing a cavity comprising:
 a. providing a substantially planar sealing body including:
  i. providing a first metal material layer of constant thickness;
  ii. bonding a second material layer of expandable material to the first material layer, the second material layer having a lower rigidity than the first material layer, wherein the second material layer has the same shape as and is coextensive with the first material layer;
 b. providing one or more anti-rotational fasteners attached to or integrally formed with either or both of the first and second material layer, wherein each of the one or more fasteners includes a first portion for attaching to a cavity wall and a second portion attached to the sealing body;
 c. attaching the first portion of the one or more fasteners to a cavity wall wherein the first portion is projecting substantially laterally out of the plane of the sealing body;
 d. arranging the sealing body within the cavity so that the sealing body projects substantially rigidly away from the cavity wall in a predetermined configuration;
 wherein the perimeter of the sealing body is generally shaped to fit within the cross-section of the cavity and has a profile substantially similar to that of the cavity it is sealing; and
 wherein the sealing body can be deformed and still retain its shape by virtue of the first material layer and resists sagging under its own weight at a temperature to at least above 250° F.

* * * * *